United States Patent
Barnett et al.

(10) Patent No.: US 9,514,714 B2
(45) Date of Patent: Dec. 6, 2016

(54) KINETIC MAPPING

(71) Applicant: Microsoft Technology Licensing, LLC, Redmond, WA (US)

(72) Inventors: Donald A. Barnett, Monroe, WA (US); Romualdo T. Impas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/089,124

(22) Filed: Nov. 25, 2013

(65) Prior Publication Data
US 2015/0145865 A1  May 28, 2015

(51) Int. Cl.
*G06T 17/05* (2011.01)
*G09G 5/30* (2006.01)
(Continued)

(52) U.S. Cl.
CPC .............. *G09G 5/30* (2013.01); *G01C 21/367* (2013.01); *G01C 21/3676* (2013.01); *G06F 3/04842* (2013.01); *G06F 3/04845* (2013.01); *G06T 17/05* (2013.01); *G09G 5/227* (2013.01); *G09G 5/373* (2013.01); *G09G 2340/045* (2013.01);
(Continued)

(58) Field of Classification Search
CPC ............ G06T 17/05; G01C 21/3667–21/3676; G01C 21/3679–21/3685; G06F 17/30241; G06F 17/3087; G09B 19/0061
See application file for complete search history.

(56) References Cited

U.S. PATENT DOCUMENTS 7,548,814 B2   6/2009   Pantalone et al.
7,649,534 B2   1/2010   Salmre
(Continued)

FOREIGN PATENT DOCUMENTS

WO    2012152982 A1    11/2012

OTHER PUBLICATIONS

Chamberlain, Paul, "6 Ways to Tell Your Story with Interactive Maps", published on: Jun. 24, 2013, pp. 1-21, available at http://ms-ds.com/our-thinking/insights/6-ways-tell-your-story-interactive-maps and http://50problems50days.com/).*

(Continued)

*Primary Examiner* — Jacinta M Crawford
*Assistant Examiner* — Diane Wills
(74) *Attorney, Agent, or Firm* — Steven Spellman; Tom Wong; Micky Minhas

(57) ABSTRACT

One or more techniques and/or systems are provided for kinetic mapping. A spatial interface, such as a map, may represent information according to an overview scale. If the spatial interface comprises a substantial amount of uninteresting content, such as a 100 mile stretch of highway, compared to interesting content, such as a 1 mile complex detour after the highway, then the interesting content may not be displayed at an adequate level of detail due to being displayed at the same overview scale as the 100 mile stretch of highway. Accordingly, points of interest within the spatial interface may be identified and encapsulated to create portals representing such information at relatively higher levels of detail. A kinetic geospatial interface comprising the portals (e.g., the detour) at a focused scale and non-portal information (e.g., the highway) at a collapsed scale (e.g., a lower level of detail than the focused scale) is generated.

20 Claims, 10 Drawing Sheets

(51) Int. Cl.
*G09G 5/373* (2006.01)
*G09G 5/22* (2006.01)
*G06F 3/0484* (2013.01)
*G01C 21/36* (2006.01)

(52) U.S. Cl.
CPC *G09G 2340/0407* (2013.01); *G09G 2340/145* (2013.01); *G09G 2354/00* (2013.01)

(56) References Cited

U.S. PATENT DOCUMENTS

| | | | |
|---|---|---|---|
| 7,818,116 | B1 | 10/2010 | Nesbitt |
| 8,135,539 | B2 | 3/2012 | Nesbitt |
| 8,200,037 | B2 | 6/2012 | Ephstein et al. |
| 8,493,407 | B2 | 7/2013 | Arrasvuori |
| 2008/0147313 | A1* | 6/2008 | Nesbitt ............... G01C 21/367 701/426 |
| 2008/0312942 | A1 | 12/2008 | Katta et al. |
| 2011/0196610 | A1 | 8/2011 | Waldman et al. |
| 2012/0316782 | A1* | 12/2012 | Sartipi ............... G01C 21/367 701/455 |
| 2014/0047354 | A1* | 2/2014 | Karamchedu ............ G06F 3/01 715/753 |
| 2014/0071170 | A1* | 3/2014 | Kroeber ............... G01C 21/367 345/660 |
| 2014/0104280 | A1* | 4/2014 | Ofstad ................ G06T 11/00 345/440 |
| 2014/0310655 | A1* | 10/2014 | Sims .................. G06F 3/0482 715/838 |
| 2015/0095350 | A1* | 4/2015 | Chen .................. G06F 17/27 707/749 |
| 2015/0170403 | A1* | 6/2015 | Barcay ............... G06K 9/00476 345/427 |

OTHER PUBLICATIONS

"International Search Report and Written Opinion Received for PCT Patent Application No. PCT/US2014/066482", Mailed Date: Feb. 16, 2015, 8 Pages.

Fuchs, et al., "Extended Focus & Context for Visualizing Abstract Data on Maps", In Workshop on Information Visualization, Presentation, and Design, Mar. 29, 2004, 5 pages, http://www.informatik.uni-rostock.de/~schumann/papers/2004+/FuchsKreuselerSchumannCODATA2004.pdf.

"Client Side Clustering", Published on: Jan. 20, 2009, pp. 13, Available at: http://msdn.microsoft.com/en-us/library/cc161072.aspx.

Perttula, et al., "Kartta: Extracting Landmarks near Personalized Points-of-Interest from User Generated Content", In Human-Computer Interaction with Mobile Devices and Services, Sep. 15, 2009, 2 pages, http://www.fxpal.com/publications/FXPAL-PR-09-504.pdf.

Chamberlain, Paul, "6 Ways to Tell Your Story with Interactive Maps", Published on: Jun. 24, 2013, pp. 21, Available at: http://ms-ds.com/our-thinking/insights/6-ways-tell-your-story-interactive-maps.

"International Preliminary Report on Patentability Issued in Patent Application No. PCT/US2014/066482", Mailed Date: Feb. 4, 2016, 8 Pages.

"Second Written Opinion Issued in PCT Application No. PCT/US2014/066482", Mailed Date: Aug. 14, 2015, 7 Pages.

* cited by examiner

KINETIC MAPPING

BACKGROUND

Many applications and/or websites may provide geospatial interfaces. In an example, a mobile device may host a driving app configured to provide driving directions through a map interface. In another example, a vacation planning website may display vacation destinations through a map interface. Often times there may be points of interest on a map that are far enough apart that there is a substantial amount of uninteresting or useless space between such points (e.g., miles of ocean along a vacation trip from San Francisco to Hawaii). Because the map may maintain the same scale for the points of interest and the less useful space, the map may not provide an adequate granularity of detail for the points of interest. In an example, the driving app may route driving directions comprising a 1 mile portion of complex city driving to reach an on-ramp, a 100 mile straightaway of highway travel, and a 0.5 mile portion of complex city driving from an off-ramp to reach a destination. Unfortunately, the 1 mile complex portion and the 0.05 mile complex portion may be displayed at the same granularity (e.g., size, level of detail, scale, etc.) as the 100 mile straightaway, which may force the complex portions to be displayed at suboptimal levels of detail than what may otherwise be useful to a user (e.g., a user of a mobile device comprising a relatively small screen). In another example, an image (e.g., photo) interface may display GPS located images captured by a user in New York and in Seattle but none in between. Thus, the user may be forced to look at a map of the entire United States that comprises the New York images, the Seattle images, and a substantial amount of dead space without images. Because the map is scaled to the entire United States, the New York images and the Seattle images may not be placed on the map at accurate capture locations and/or may overlap or occlude one another.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for kinetic mapping are provided herein. A geospatial interface, such as a map, may represent information according to an overview scale. For example, a map of a city may display driving directions from a current location of a mobile device to a convention center 120 miles away. The map may display information associated with the driving directions, such as roads, gas stations, hotels, businesses, and/or geography, at the overview scale (e.g., 1:50,000). As provided herein, points of interest within the geospatial interface may be identified so that such points of interest (e.g., a complex detour) may be displayed at a focused scale having a higher granularity (e.g., a scale of 1:1,000 that provides a greater amount of detail and/or size) than relatively uninteresting content (e.g., a 50 mile straightaway of highway driving).

In an example, the 120 mile driving route may comprise 50 miles of a first straight highway, a complex interchange, 60 miles of a second straight highway, and 10 miles of city driving with a 0.5 mile detour. The complex interchange may be identified as a first point of interest and the 0.5 mile detour may be identified as a second point of interest. The first point of interest may be encapsulated to create a first portal representing the complex interchange at a first focused scale having a relatively high level of detail (e.g., a 1:500 scale). The second point of interest may be encapsulated to create a second portal representing the 0.5 mile detour at a second focused scale having a relatively high level of detail (e.g., a 1:1000 scale). A kinetic geospatial interface may be created based upon the geospatial interface. For example, the kinetic geospatial interface may comprise the first portal at the first focused scale, the second portal at the second focused scale, and non-portal information (e.g., the first straight highway and the second straight highway) at a collapsed scale (e.g., a scale that displays non-portal information at a lower level of detail than the focused scale, such as the overview scale or a scale less detailed than the overview scale). In this way, the first portal and the second portal may display relatively higher levels of detail at a larger size than non-portal information within the kinetic geospatial interface. In an example, the kinetic geospatial interface may be displayed through a mobile device having a relatively small screen so that a user may adequately view details for the points of interest through the portals.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
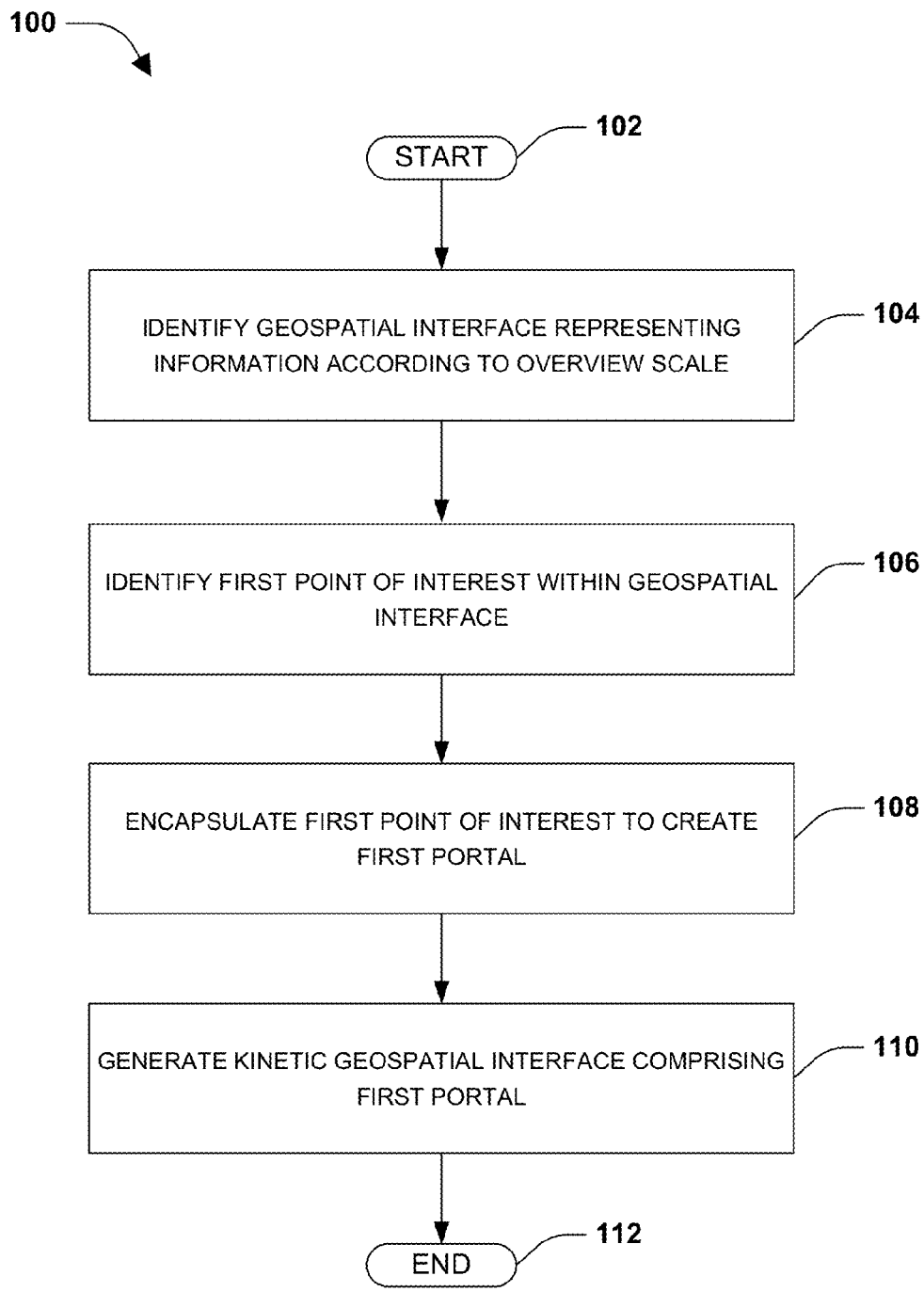
FIG. 1 is a flow diagram illustrating an exemplary method of kinetic mapping.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of kinetic mapping is illustrated by an exemplary method 100 of FIG. 1. At 102, the method starts. At 104, a geospatial interface representing information according to an overview scale may be identified. For example, the geospatial interface may be associated with a vacation app on a mobile device. The geospatial interface may comprise a map of Jamaica corresponding to various resorts across Jamaica, such as northern resorts along a northern shore, southern resorts along a southern shore, eastern resort along an eastern shore, and western resorts along an eastern shore. The geospatial interface may represent information about Jamaica according to an overview scale where interesting content, such as the resorts, and uninteresting content, such as an uninhabited central portion, are displayed at the same level of granularity or detail. Thus, the geospatial interface may not provide an adequate level of detail for the resorts because a substantial portion of the map may be consumed with the uninhabited central portion. Accordingly, as provided herein, points of interest may be identified and/or displayed at higher levels of granularity or detail than uninteresting portions of the map. It is to be appreciated that although interesting and/or uninteresting portions of the map are mentioned herein, that the instant application including the scope of the appended claims is not necessarily to be limited thereby. For example, some portions of the map that may not necessarily be regarded as uninteresting may be displayed at a different granularity than other portions of the map. Examples provided herein are not necessarily meant to be limiting.

At 106, a first point of interest within the geospatial interface may be identified. For example, the eastern resorts along the eastern shore may be identified as the first point of interest based upon the eastern shore comprising resorts having relatively high user ratings. It may be appreciated that a variety of criteria may be taken into account when identifying a point of interest, such as social network information (e.g., a user may post that the user has an interest in a particular chain of resorts in Jamaica, one of which is located on the eastern shore), email information (e.g., the user may receive an email from a spouse about a particular eastern resort), entity information (e.g., a travel service that the user may have previously used may identify locations of resorts in Jamaica), user ratings (e.g., users may rate resorts in Jamaica), news stories (e.g., news stories about a new world renowned spa opening near the eastern shore that may be interesting to travelers; a closure of a resort; etc.), transportation information (e.g., identification of a detour, complex driving directions, on-ramps, airports, traffic conditions, etc.), user tasks (e.g., the user may have a task to attend a conference in eastern Jamaica), image location data (e.g., a concentration of vacation images may be located at the eastern shore, but not the central portion of Jamaica), and/or a variety of other criteria (e.g., information from an information source to which the user opted-in to link to a kinetic mapping component or service). In an example, one or more points of interest may be identified, such as the western resorts along the western shore being identified as a second point of interest. It may be appreciated that a point of interest may correspond to various information, such as a location at which a concentration of images are above a threshold concentration (e.g., a concentration of vacation images at a western resort), a driving route segment (e.g., a complex driving route), an entity (e.g., a vacation horse riding stable, a vacation waterfall climbing location, a mall, a restaurant, a conference center, a friend's house, home, an airport, etc.), and/or a variety of other information.

At 108, the first point of interest may be encapsulated to create a first portal. In an example, the first portal corresponds to a visual interface element within which the first point of interest is displayed. In an example, the first portal may be an interactive interface element through which a user may interact with information, such as panning around the first point of interest (e.g., the user may cycle through eastern resorts; the user may pan around the eastern coast or anywhere in Jamaica; the user may zoom-in or zoom-out; the user may tag information or make notes; etc.). The interactive interface element may comprise an action interface through which information about entities may be displayed (e.g., user reviews, hours, phone number, menus, activities or other information for an eastern resort may be displayed; social network information about an entity, such as a social network post about a water fall, may be displayed, etc.). In an example, the action interface may specify a meeting scheduled for the first point of interest (e.g., a meeting reminder may be displayed for the conference center). In another example, the action interface may specify a social network profile of an entity associated with the first point of interest. In another example, the action interface may specify an action invokable by a user to perform an action associated with the first point of interest (e.g., book a reservation, call the eastern resort, send a snapshot from the first portal to a second user, create an email or reminder about the eastern resort, and/or a plethora of other actions). In this way, one or more portals, such as a second portal encapsulating the second point of interest, may be created.

At 110, a kinetic geospatial interface comprising the first portal and/or other portals, such as the second portal, may be generated. The first portal may be displayed according to a focused scale that displays information at a relatively higher granularity than the overview scale. For example, the focused scale may display an eastern resort at a higher level of detail and/or size than information not within a portal, such as building in central Jamaica. Non-portal information may be displayed according to a collapsed scale. In an example, the collapsed scale may display information at a lower granularity than the focused scale. In another example, the collapsed scale may display information at a similar granularity as the overview scale (e.g., a portion of the eastern coast that is relatively close to, but outside of, the first portal may have a collapsed scale similar to the overview scale). In another example, the collapsed scale may display information at a lower granularity than the overview scale (e.g., a 200 mile stretch of forest within the central portion of Jamaica may be collapsed to a level of detail and/or size that is substantially smaller than other portions of Jamaica that may be more interesting such as the portion of the eastern coast that is relatively close to, but outside of, the first portal). In this way, information, such as points of interest, displayed through portals may be displayed at relatively higher levels of detail and/or size than non-portal information, such as geography, roads, entities, businesses, or other locations not within portals. Thus, a user may view points of interest through the kinetic geospatial interface at a relatively higher level of detail and/or size than would otherwise be viewable through the geospatial interface due to the geospatial interface merely displaying information, such as the uninhabited central portion of Jamaica, at the same scale.

In an example, the first portal comprises a portal edge representing a barrier separating content within the first portal, corresponding to the first point of interest, and the non-portal information. The portal edge may be interactive such that a user may interact with the portal edge to expand the first portal, shrink the first portal, zoom into the first portal, pan the first portal around the kinetic geospatial interface, invoke actions through an action interface populated along the portal edge, etc. Various information may be populated within the first portal. In an example, one or more images may be displayed, such as vacation images of the eastern resort that are retrieved from an image sharing social network. In another example, entity information for an entity may be displayed through the first portal, such as a user rating for the eastern resort and/or a visual representation of the eastern resort. The entity information may be displayed at a higher granularity and/or size than non-portal information, such as a building within the central portion of Jamaica that may not be relevant to a user. In an example, area inside a portal may be geospatially accurate, whereas area outside the portal may or may not be collapsed (e.g., may or may not be geospatially accurate). In this way, a user may clearly delineate or visually perceive area inside the portal from area outside the portal, such as based upon a portal edge of the portal. The area outside the portal may be changed from a geospatially accurate view to a collapsed view and/or otherwise changed from a geospatially accurate view to a less accurate geospatially accurate view, such as a collapsed view.

In an example, a plurality of portals may be dynamically arranged and/or rearranged within the kinetic geospatial interface. In an example, the plurality of portals may be arranged according to an aspect ratio arrangement solution (e.g., portals and/or information therein may be arranged and/or sized so that information may be displayed at a desirable aspect ratio). In an example, the plurality of portals may be arranged according to a directional arrangement solution (e.g., a first eastern portal and a second eastern portal may correspond to locations relative close to one another, and thus the first eastern portal and the second eastern portal may be directionally/spatially arranged with respect to one another to mitigate overlap or occlusion). In another example, the plurality of portals may be arranged according to a step-by-step arrangement solution and/or a narrative ordering (e.g., portals may be arranged in a sequential order, such as a storybook of vacation images captured at the point of interest that are ordered according to capture dates). It may be appreciated that portals may be dynamically arranged and/or rearranged (e.g., automatically or based upon a user selection of a particular arrangement order) according to various orderings, such as a user need arrangement solution (e.g., an ordering of portals based upon a vacation itinerary), a linear ordering, cardinal directions ordering, a temporal order (e.g., hours, days, months, and/or other temporal indicators, such as a timeline or chart, may be populated within the kinetic geospatial interface to aid in illustrating a temporal order of locations that are to be visited during a vacation), etc.

Various interactions may be facilitated for the first portal. In an example, responsive to a first interaction with the first portal, a zoom-in operation may be performed for the first point of interest. The zoom-in operation may display the first point of interest at a relatively higher granularity and/or size than the focused scale. Responsive to a second interaction indicating a focus shift from the first portal to the second portal, a zoom switch operation from the first point of interest to the second point of interest encapsulated within the second portal may be performed. For example, the second portal may be brought into focus (e.g., centered within the kinetic geospatial interface) and/or the second point of interest (e.g., instead of the first point of interest) may be displayed at the focused scale or a relatively higher granularity and/or size than the focused scale. In this way, a user may efficiently switch between portals. In another example, responsive to interaction with the non-portal information, the kinetic geospatial interface may be transitioned to the overview scale. For example, the first portal may be removed and/or replaced with a placeholder that may be invoked to return the first portal. In another example, navigation may be facilitated between a plurality of portals populated within the kinetic geospatial interface based upon user navigation. For example, a carousel interface populated with the plurality of portals may be displayed such that a user may navigate from one portal to the next in a continuous manner. It may be appreciated that a variety of navigation interfaces or commands are contemplated herein. At 112, the method ends.

Figure 2:
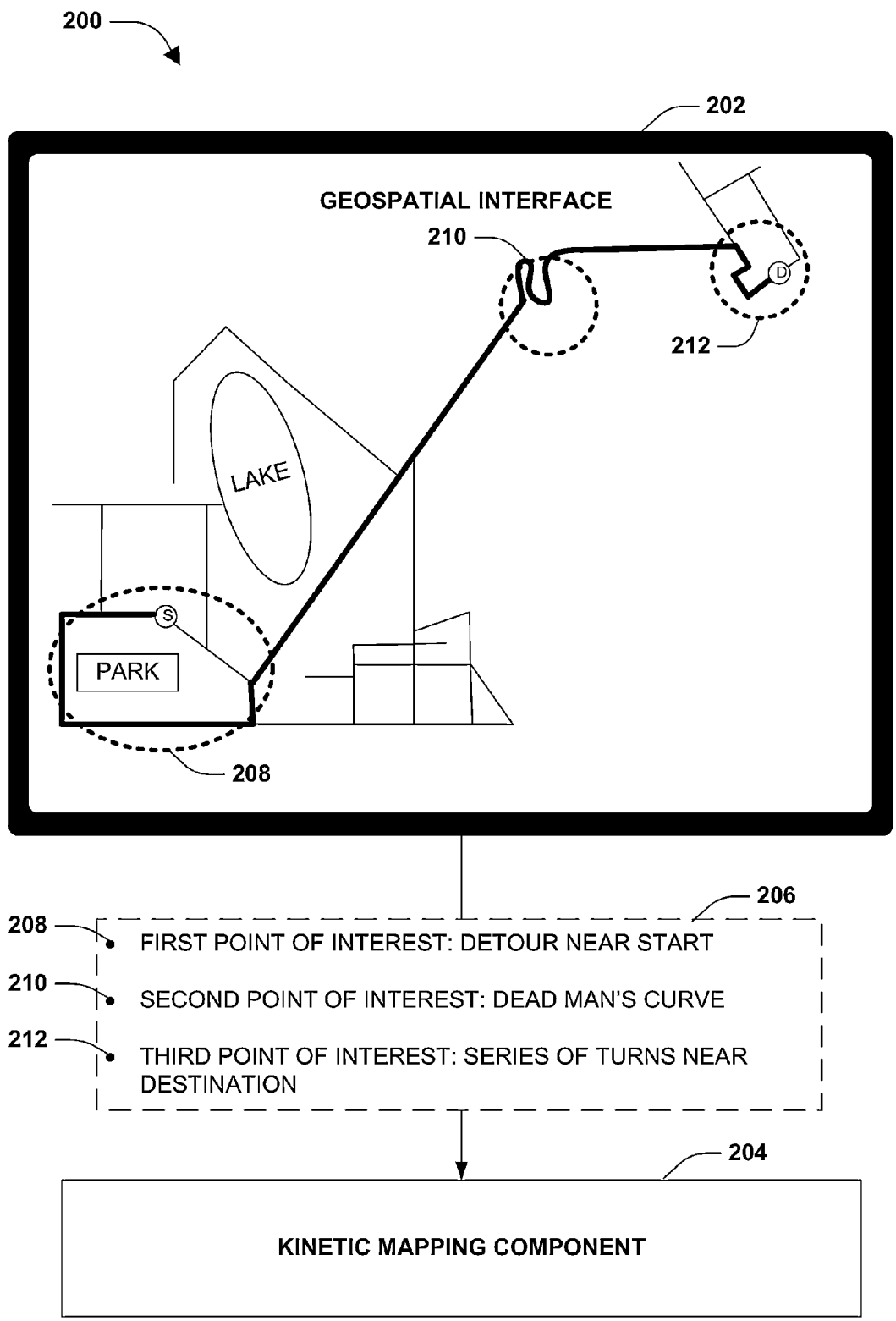
FIG. 2 is a component block diagram illustrating an exemplary system for identifying one or more points of interest for kinetic mapping.

FIG. 2 illustrates a system 200 for identifying one or more points of interest 206 for kinetic mapping. The system 200 comprises a kinetic mapping component 204. The kinetic mapping component 204 may be associated with a geospatial interface 202, such as a map provided by a mapping app on a mobile device. The geospatial interface 202 may display information according to an overview scale (e.g., a 1:50,000 scale). For example, the geospatial interface 202 may correspond to driving directions from a user's home (S) to a birthday party destination (D) that entails a first complex portion (e.g., a detour around a park that leads to an entrance ramp to a first straight highway portion), the first straight highway portion (e.g., 40 miles of non-complex driving), a deadman's curve (e.g., a series of complex turns along the highway), a second straight highway portion (e.g., 20 miles from the deadman's curve to an off-ramp), and a second complex portion (e.g., a series of turns through a neighborhood to get to the birthday party destination (D)). The kinetic mapping component 204 may be configured to identify the one or more points of interest 206 within the geospatial interface 202. In an example, the kinetic mapping component 204 may identify points of interest corresponding to complex driving routes (e.g., an on-ramp, a detour, etc.), entities (e.g., restaurants, stores, parks, or other locations corresponding to tasks or events identified from information about a user, such as an email, a calendar, a social network profile, etc.), and/or a variety of other information.

In an example, the kinetic mapping component 204 may identify the detour near the user's home (S) as a first point of interest 208 because displaying the detour at a relatively higher granularity, detail, and/or size compared with other information may be beneficial for a user. Similarly, the deadman's curve may be identified as a second point of interest 210, and the series of turns near the birthday party destination (D) may be identified as a third point of interest 212. In this way, the one or more points of interest 206 may be identified for encapsulation within portals for display at relatively higher granularity, detail, and/or size compared with other non-portal information, such as the first and second straight highway portion totaling 60 miles of non-complex and/or uninteresting driving (e.g., the straight highway portions may be collapsed to provide additional viewing space for the portals).

Figure 3:
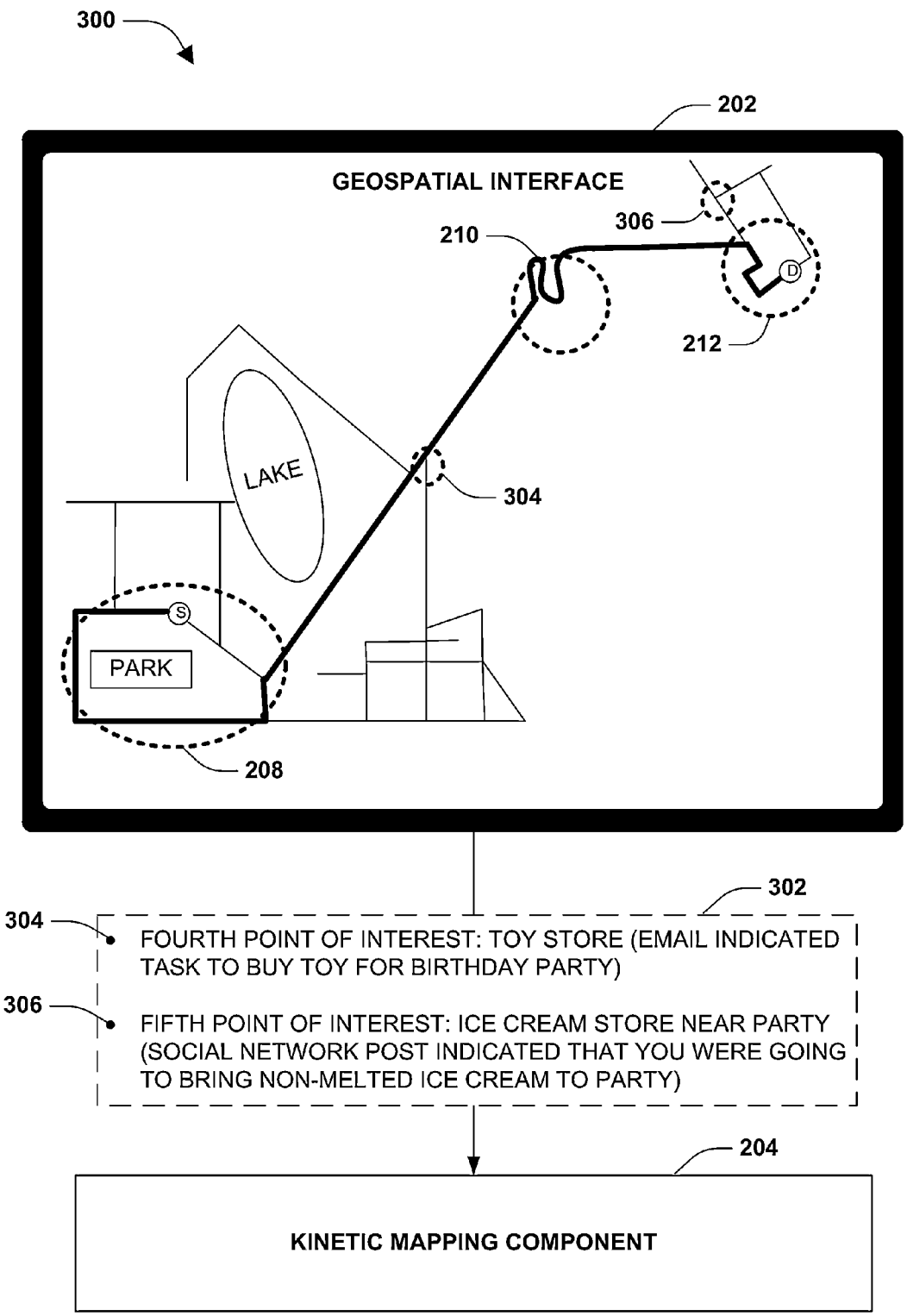
FIG. 3 is an illustration of an example of identifying one or more points of interest for kinetic mapping based upon supplemental information.

FIG. 3 illustrates an example 300 of identifying one or more points of interest 302 for kinetic mapping based upon supplemental information. It may be appreciated that in one example, a kinetic mapping component 204 may be associated with a geospatial interface 202 corresponding to driving directions from a user's home (S) to a birthday party destination (D), and that the kinetic mapping component 204 may have identified one or more points of interest 206 such as a first point of interest 208, a second point of interest 210, and a third point of interest 212, as illustrated in FIG. 2. The kinetic mapping component 204 may identify the one or more points of interest 302 based upon supplemental information, such as tasks, emails, calendar entries, social network information, a search query history, local files such as images, and/or a variety of other information.

In an example, the kinetic mapping component 204 may identify a toy store as a fourth point of interest 304 based upon an email indicating a task to buy a toy for the birthday party at the birthday party destination (D). The fourth point of interest 304 may be identified because it may be advantageous to display directions to and/or information about the toy store at a relatively higher granularity, detail, and/or size compared with other less interesting information, such as a straight highway portions along the route from the user's home (S) to the birthday party destination (D). The kinetic mapping component 204 may identify an ice cream store near the birthday party destination (D) as a fifth point of interest 306 based upon a social network post indicating that a user would bring non-melted ice cream to the birthday party. In this way, various points of interest may be identified within the geospatial interface 202.

Figure 4A:
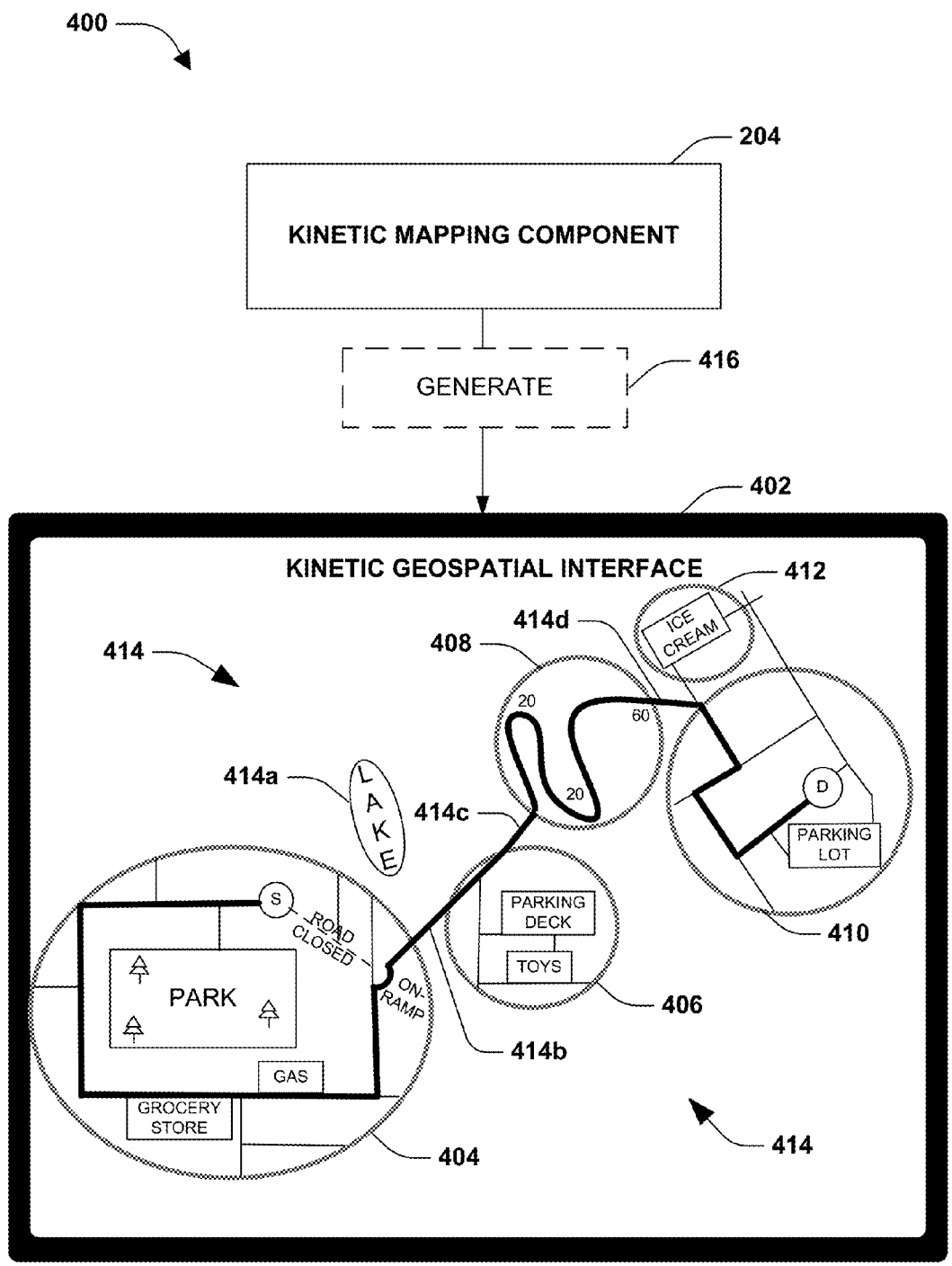
FIG. 4A is a component block diagram illustrating an exemplary system for generating a kinetic geospatial interface.

FIG. 4A illustrates an example of a system 400 for generating 416 a kinetic geospatial interface 402. The system 400 comprises a kinetic mapping component 204. It may be appreciated that in one example, the kinetic mapping component 204 may have identified one or more points of interest 206 and/or one or more points of interest 302, such as a first point of interest 208, a second point of interest 210, a third point of interest 212, a fourth point of interest 304, and/or a fifth point of interest 306, as illustrated in FIGS. 2 and 3. The kinetic mapping component 204 may encapsulate points of interest into portals for display through the kinetic geospatial interface 402 at focused scales that are relatively higher granularity (e.g., more details, larger size, more accurate scale, etc.) than non-portal information 414, such as a first stretch of highway 414b, a second stretch of highway 414c, a third stretch of highway 414d, a lake 414a, and/or less interesting or relevant geography. In an example, the non-portal information 414 may be displayed through the kinetic geospatial interface 402 according to a collapsed scale. For example, the first stretch of highway 414b, the second stretch of highway 414c, the third stretch of highway 414d, and/or the lake 414a may be displayed at a lower level of detail and/or a smaller size than focused scales at which portals are displayed.

In an example, a first portal 404 comprises detour information associated with the first point of interest 208. The first portal 404 may display the detour information at a first focused scale with a level of detail that may aid a user in easily navigating the detour to the on-ramp (e.g., a road closed indicator and a new route to the on-ramp may be displayed). Because the first stretch of highway 414b may be relatively uninteresting to the user, the first stretch of highway 414b may be displayed at the collapsed scale (e.g., less detail and/or smaller size than the first focused scale). A fourth portal 406, comprising toy store information associated with the fourth point of interest 304, may be displayed at a second focused scale with a level of detail that may aid the user in reaching a toy store and/or returning to the highway (e.g., a parking deck for the toy store may be displayed). Because the lake 414a and the second stretch of highway 414c may be relatively uninteresting to the user, the lake 414a and the second stretch of highway 414c may be displayed at the collapsed scale. A second portal 408, comprising deadman's curve information associated with the second point of interest 210, may be displayed at a third focused scale with a level of detail that may aid a user in safely navigating the deadman's curve (e.g., speed limits may be displayed). Because the third stretch of highway 414d may be relatively uninteresting to the user, the third stretch of highway 414d may be displayed at the collapsed scale. A fifth portal 412, comprising ice cream information for the fifth point of interest 306, may be displayed at a fifth focused scale with a level of detail that may aid a user in locating an ice cream store. A third portal 410, comprising birthday party driving directions associated with the third point of interest 212, may be displayed at a third focused scale with a level of detail that may aid a user in reaching the birthday party destination (e.g., turn-by-turn directions to a parking lot for a condo complex at which the birthday party is hosted).

In an example, the first focused scale, the second focused scale, the third focused scale, the fourth focused scale, and/or the fifth focused scale may have the same or different scales based upon user relevancy rankings for points of interests within corresponding portals. For example, the first focused scale of the first portal 404 may display information at a relatively higher granularity than the fourth focused scale for the fourth portal 406 because the user may or may not have an interest in accessing the toy store (e.g., the user may already have purchased a toy). In this way, portals may be arranged, sized, and/or adjust to various degrees of granularity within the kinetic geospatial interface 402. The relevance of points of interest may change over time and thus the respective scales of the portals may change as well. For example, a location device, such as GPS, may indicate the location of the user along the route such that the first portal 404 has the greatest degree of detail when the user is departing the user's home. The first portal 404 may then (e.g., proportionally) shrink or show less detail while the fourth portal 406 enlarges to show greater detail as the user gets closer to the fourth point of interest of the toy store (e.g., because the toy store becomes more relevant to the user as the user approaches the toy store). Other portals may similarly grow and/or shrink based upon the location of the user and/or other factors that contribute to relevancy to the user. For example, given the relevance of the third point of interest of the birthday party destination (D) to the entire trip, the third portal 410 may never shrink below a predetermined scale.

Figure 4B:
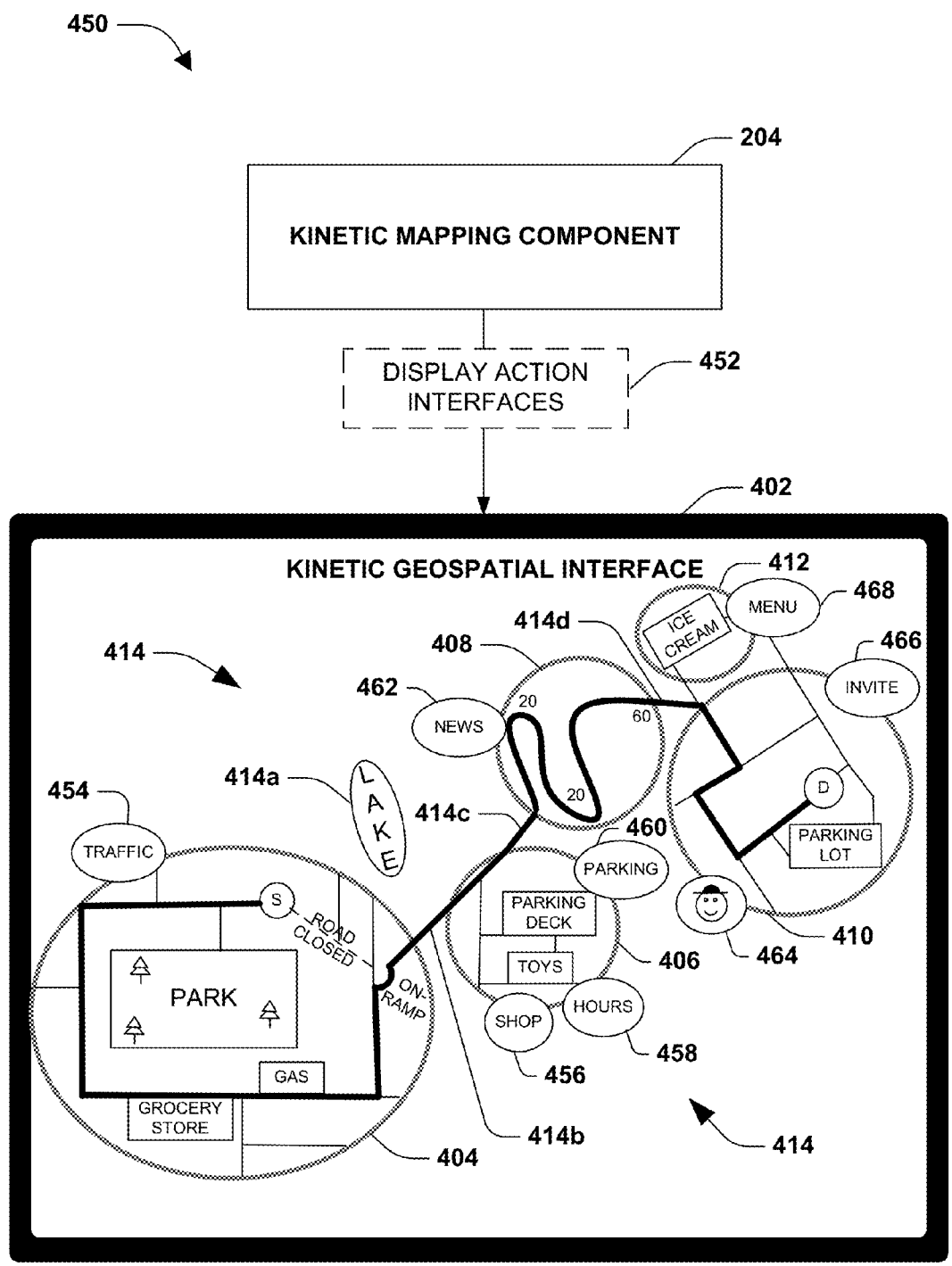
FIG. 4B is an illustration of an example of displaying action interfaces for portals within a kinetic geospatial interface.

FIG. 4B illustrates an example 450 of displaying action interfaces 452 for portals within a kinetic geospatial interface 402. It may be appreciated that the kinetic geospatial interface 402 may have been generated and/or populated with portals by a kinetic mapping component 204, as illustrated in FIG. 4A. In an example, a traffic action interface 454 may be displayed for a first portal 404 based upon a detour associated with a first point of interest 208. The traffic action interface 454 may be invoked to provide a user with an updated traffic report. A shopping action interface 456, an hours of operation interface 458, and/or a parking action interface 460 may be displayed for a fourth portal 406 based upon the toy store and the parking deck associated with a fourth point of interest 304. The shopping action interface

456 may be invoked to view a toy store shopping website. The hours of operation interface 458 may be invoked to see hours of operation for the toy store. The parking action interface 460 may be invoked to determine whether the parking deck is full. A news action interface 462 may be displayed for a second portal 408 based upon the deadman's curve associated with a second point of interest 210. The news action interface 462 may be invoked to view a news article about the deadman's curve. A menu action interface 468 may be displayed for a fifth portal 412 based upon the ice cream store associated with a fifth point of interest 306. The menu action interface 468 may be invoked to display a menu for the ice cream store. A view invitation action interface 466 and a persona action interface 464 may be displayed for a third portal 410 based upon the birthday party destination (D) associated with a third point of interest 212. The invite reader action interface 466 may be invoked to read a birthday party invite. The persona action interface 464 may be invoked to view a social network profile of the birthday girl. In this way, a user may invoke various actions through the kinetic geospatial interface 402.

Figure 5:
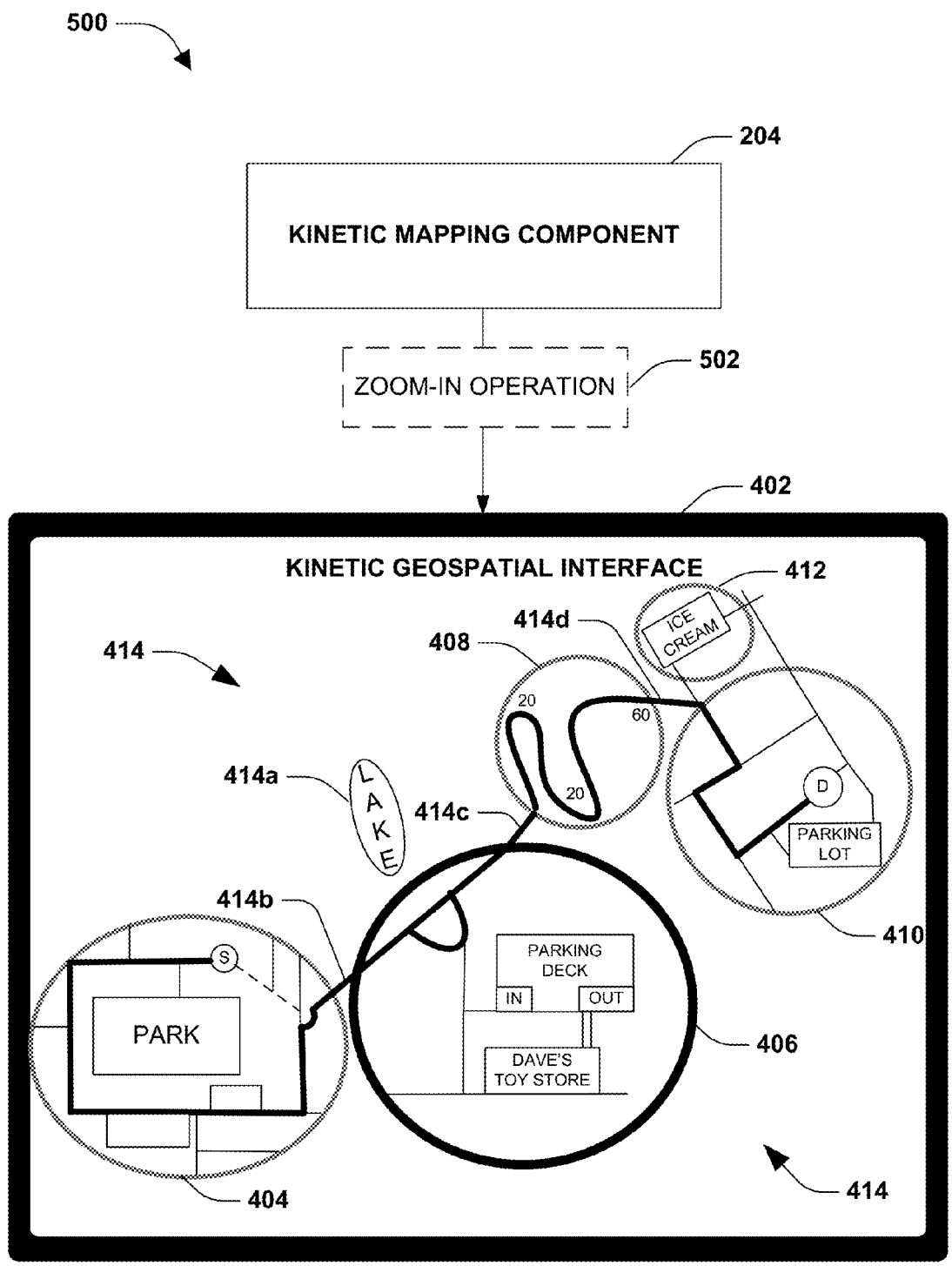
FIG. 5 is an illustration of an example of a zoom-in operation.

FIG. 5 illustrates an example 500 of a zoom-in operation 502. It may be appreciated that a kinetic geospatial interface 402 may have been generated and/or populated with portals by a kinetic mapping component 204, as illustrated in FIG. 4A. The kinetic mapping component 204 may be configured to facilitate user interaction with portals and/or navigation between portals. In an example, the kinetic mapping component 204 may detect a first interaction with a fourth portal 406. Responsive to the first interaction, the zoom-in operation 502 may be performed for a fourth point of interest 304. In an example, a size of the forth portal 406 may be increased and/or a level of detail for the fourth point of interest 304 may be increased (e.g., an off-ramp, an on-ramp, a parking deck entrance and exit, and/or a detailed store name for a toy store may be displayed). In an example, one or more other portals may be zoomed-out. For example, a size of a first portal 404 may be decreased and/or a level of detail for a first point of interest 208 may be decreased. In this way, a user may focus on a particular portal and/or navigate between portals (e.g., a focus shift may be performed from the fourth portal 406 to a fifth portal 412, such that a size and/or level of detail for the fifth portal 412 may be increased).

Figure 6:
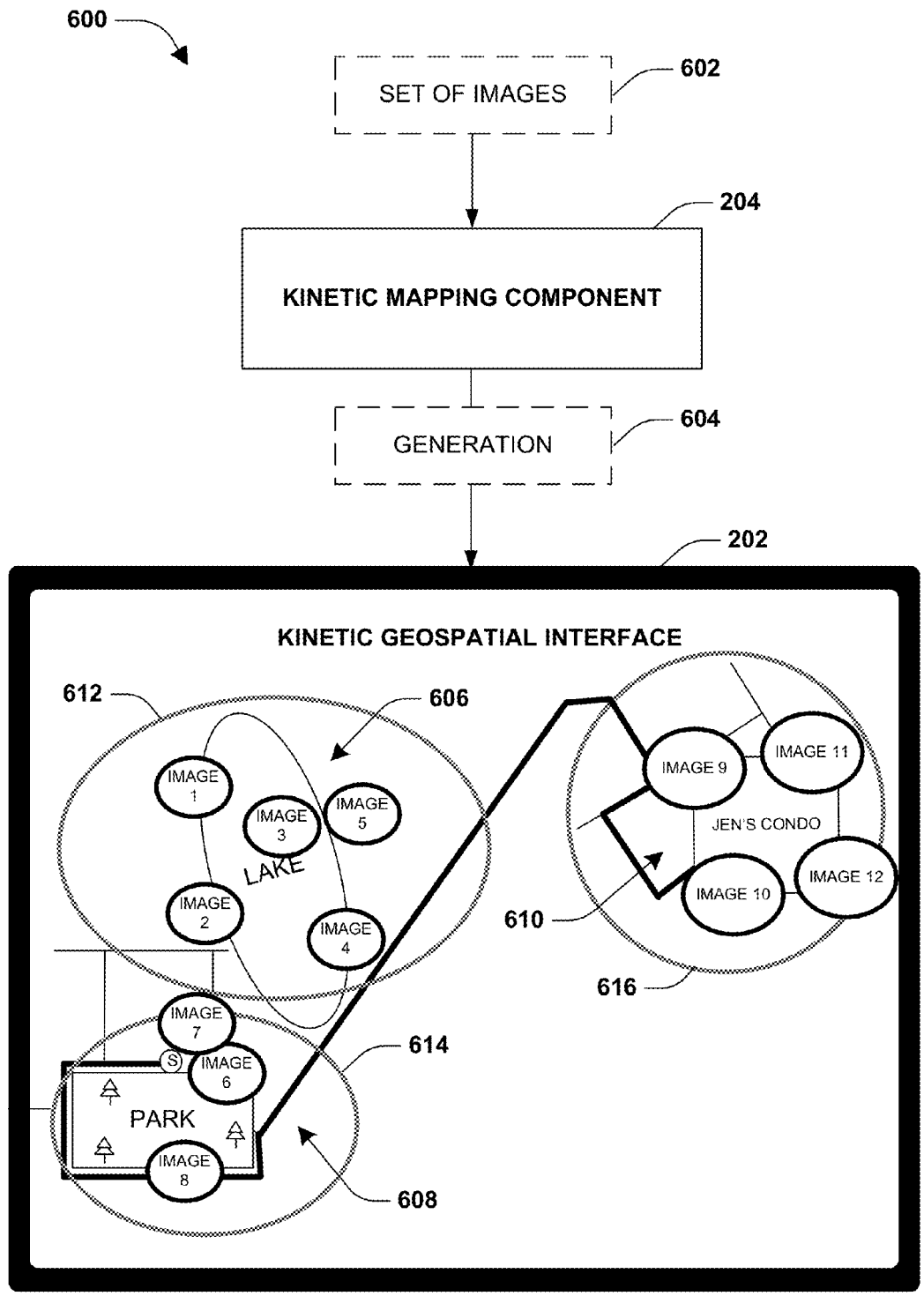
FIG. 6 is a component block diagram illustrating an exemplary system for kinetic mapping for images.

FIG. 6 illustrates a system 600 for kinetic mapping for images. The system 600 comprises a kinetic mapping component 204. The kinetic mapping component 204 may be configured to cluster a set of images into one or more image clusters based upon locational information. For example, a first cluster of images 606 may comprise a first image, a second image, a third image, a fourth image, and a fifth image captured near a lake. A second cluster of images 608 may comprise a sixth image, a seventh image, and an eight image captured near a park. A third cluster of images 610 may comprise a ninth image, a tenth image, an eleventh image, and a twelfth image captured during a birthday party at Jen's condo. The kinetic mapping component 204 may encapsulate the first cluster of images 606 to create a first portal 612. The kinetic mapping component 204 may encapsulate the second cluster of images 608 to create a second portal 614. The kinetic mapping component 204 may encapsulate the third cluster of images 610 to create a third portal 616.

The kinetic mapping component 204 may generate 604 a kinetic geospatial interface 202 comprising the first portal 612 displayed according to a first focused scale, the second portal 614 displayed according to a second focused scale, and the third portal 616 displayed according to a third focused scale. Non-portal information (e.g., a highway between the park and Jen's condo and/or other entities and geography not comprised within a portal) may be displayed according to a collapsed scale having a level of granularity, detail, and/or size that may be smaller than the first focused scale, the second focused scale, and/or the third focused scale. In this way, a user may easily identify images and/or locations at which images were captured at a relatively higher level of detail because the non-portal information (e.g., uninteresting locations at which the user may not have captured images) may be collapsed to a relatively smaller scale within the kinetic geospatial interface 202.

Figure 7:
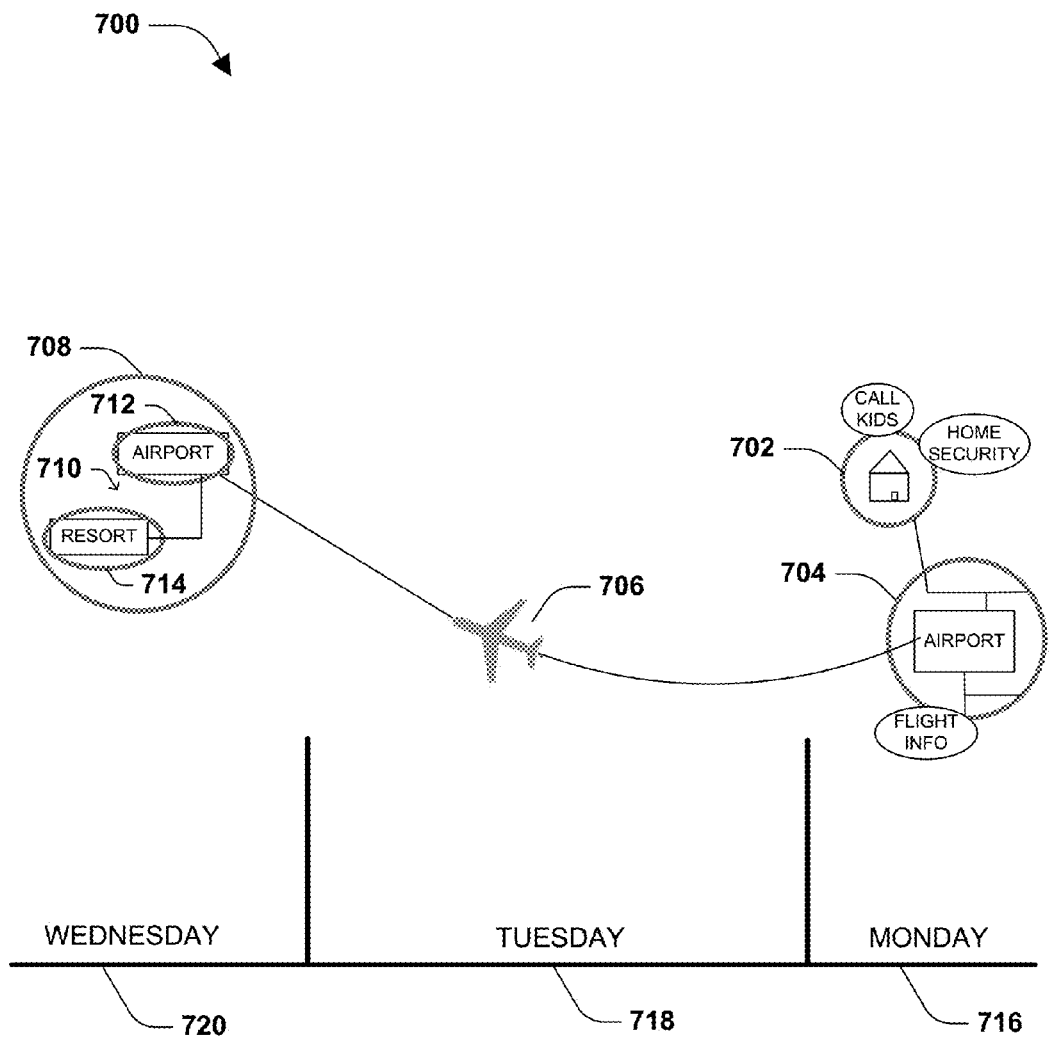
FIG. 7 is an illustration of arranging a plurality of portals within a kinetic geospatial interface according to a temporal distribution.

FIG. 7 illustrates an example of arranging a plurality of portals within a kinetic geospatial interface 700 according to a temporal distribution. In an example, the kinetic geospatial interface 700 may comprise locational information associate with a vacation of a user to a resort. The kinetic geospatial interface 700 may be populated with a first portal 702 associated with a home of the user. A call kids action interface and a home security action interface may be associated with the first portal, such that the user may invoke such action interfaces to initiate a phone call to a son's mobile device and/or to check home security details. The kinetic geospatial interface 700 may be populated with a second portal 704 associated with an airport hosting a flight that is to be taken by the user to a destination airport for the vacation. A flight info action interface may be associated with the second portal 704 so that the user may check flight information. The kinetic geospatial interface 700 may be populated with a third portal 708 associated with the destination airport and the resort. The third portal 708 may comprise a first subportal 712 for the airport, a second subportal 714 for the resort, and/or collapsed geography information 710 between the airport and the resort (e.g., a 50 mile highway stretch from the airport to the resort may be collapsed).

A Monday temporal indicator 716 may be displayed for the first portal 702 and the second portal 704 based upon a travel itinerary indicating that the user will be at home and at the airport on Monday. A Tuesday temporal indicator 718 may be displayed for a collapsed air flight indicator 706 (e.g., the collapsed air flight indicator 706 may be displayed to indicate a change in transportation mode for the vacation and/or to collapse a relatively large amount of uninteresting flight geography over a body of water) based upon the travel itinerary indicating that the user will be flying on Tuesday. A Wednesday temporal indicator 720 may be displayed for the third portal 708, the first subportal 712, and the second subportal 714 based upon the travel itinerary indicating that the user will land at the airport and arrive at the resort on Wednesday. In this way, the vacation may be displayed through the kinetic geospatial interface 700 according to a temporal distribution.

Figure 8:
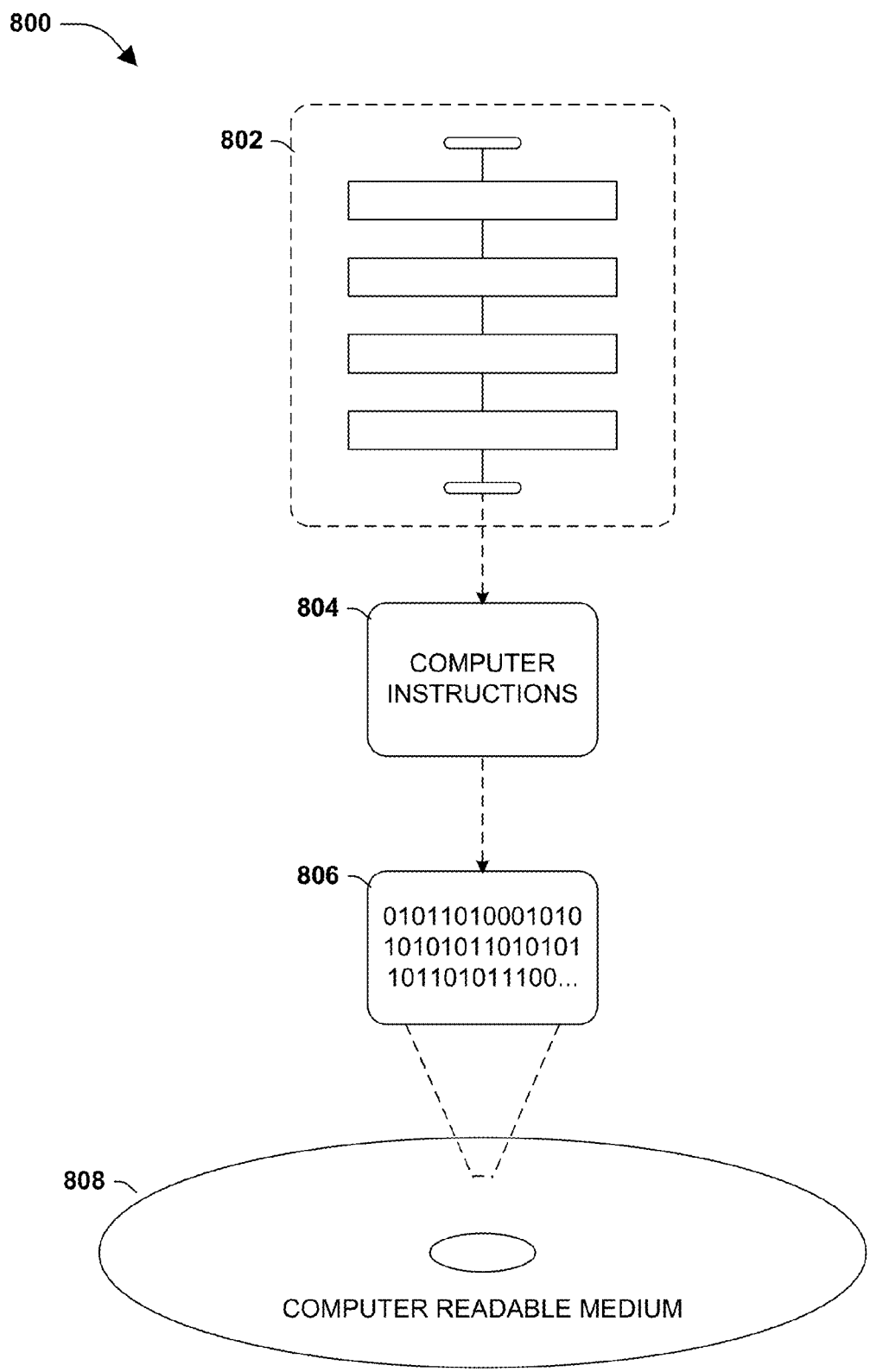
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable instructions 804 are configured to implement a system, such as at least some of the exemplary system 200 of FIG. 2, at least some of the exemplary system 400 of FIG. 4A, at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
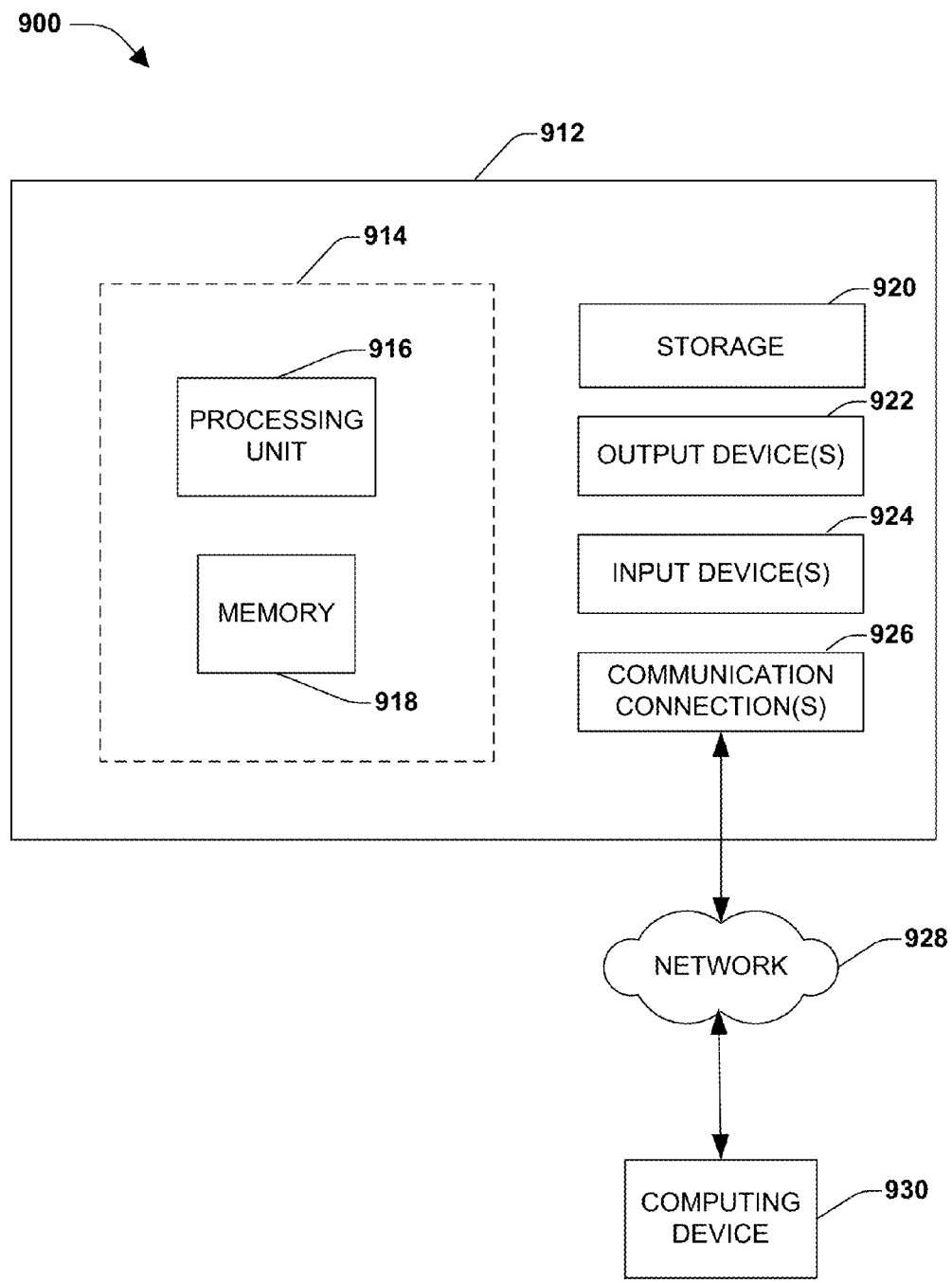
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for kinetic mapping, comprising:
   identifying a geospatial interface representing information according to an overview scale;
   identifying a first point of interest within the geospatial interface and encapsulating the first point of interest to create a first portal;
   identifying a second point of interest within the geospatial interface and encapsulating the second point of interest to create a second portal; and
   generating a kinetic geospatial interface comprising the first portal displayed according to a first focused scale, the second portal displayed according to a second focused scale, and non-portal information displayed according to a collapsed scale;
   wherein the granularity of the first focused scale and the granularity of the second focused scale are different and wherein a level of the granularity of the first focused scale as compared with a level of granularity of the second focused scale is determined by ranking a relevancy of the first point of interest to a user of the kinetic geospatial interface to a relevancy of the second point of interest to the user of the kinetic geospatial interface.

2. The method of claim 1, the first focused scale displaying information at a higher granularity than the overview scale.

3. The method of claim 1, the collapsed scale displaying information at a lower granularity than the overview scale.

4. The method of claim 1, the first point of interest corresponding to at least one of:
   a location at which a concentration of images is above a threshold concentration;
   a driving route segment; or
   an entity.

5. The method of claim 1, comprising:
   displaying one or more images through the first portal.

6. The method of claim 1, comprising:
   displaying entity information for an entity through the first portal, the entity information displayed at a higher granularity than the non-portal information.

7. The method of claim 1, comprising:
   displaying an action interface associated with the first portal, the action interface corresponding to at least one of:
   an entity associated with the first point of interest;
   a meeting scheduled for the first point of interest;
   a social network profile of an entity associated with the first point of interest; or
   an action invokable by a user to perform an action associated with the first point of interest.

8. The method of claim 1, comprising:
identifying a third point of interest within the geospatial interface;
encapsulating the third point of interest to create a third portal;
populating the kinetic geospatial interface with the third portal displayed according to at least one of the focused scale or a semi-focused scale.

9. The method of claim 1, comprising:
responsive to a first interaction with the first portal, performing a zoom-in operation for the first point of interest.

10. The method of claim 9, comprising:
responsive to a second interaction indicating a focus shift from the first portal to the second portal within the kinetic geospatial interface, performing a zoom switch operation from the first point of interest to the second point of interest encapsulated within the second portal.

11. The method of claim 1, comprising:
responsive to interaction with the non-portal information, transitioning the kinetic geospatial interface to the overview scale.

12. The method of claim 1, the kinetic geospatial interface comprising a map.

13. The method of claim 1, the method comprising:
facilitating navigation between the plurality of portals based upon user navigation input.

14. The method of claim 1, comprising:
dynamically arranging the plurality of portals within the kinetic geospatial interface based upon at least one of an aspect ratio arrangement solution, a directional arrangement solution, a step-by-step arrangement solution, a user need arrangement solution, a linear ordering, a narrative ordering, or cardinal directions.

15. The method of claim 1, comprising:
arranging the plurality of portals within the kinetic geospatial interface according to a temporal distribution, the kinetic geospatial interface comprising at least one temporal indicator.

16. The method of claim 1, the first portal comprising a portal edge representing a barrier separating content within the first portal, corresponding to the first point of interest, and the non-portal information.

17. A system for kinetic mapping, comprising at least a processing unit and memory, wherein the processing unit executes instructions stored in the memory to implement a kinetic mapping component on the system, wherein the processing unit causes the system to:
identify a geospatial interface representing information according to an overview scale;
identify a first point of interest within the geospatial interface and encapsulate the first point of interest to create a first portal;
identify a second point of interest within the geospatial interface and encapsulate the second point of interest to create a second portal; and
generate a kinetic geospatial interface comprising the first portal displayed according to a first focused scale, the second portal displayed according to a second focused scale, and non-portal information displayed according to a collapsed scale
wherein the granularity of the first focused scale and the granularity of the second focused scale are different and wherein a level of the granularity of the first focused scale as compared with a level of granularity of the second focused scale is determined by ranking a relevancy of the first point of interest to a user of the kinetic geospatial interface to a relevancy of the second point of interest to the user of the kinetic mapping component.

18. The system of claim 17, wherein the processing unit further causes the system to:
display one or more images, corresponding to the first point of interest above a correspondence threshold, through the first portal.

19. The system of claim 17, wherein the processing unit further causes the system to:
display entity information for an entity through the first portal, the entity information displayed at a higher granularity than the non-portal information.

20. A computer readable storage device that stores instructions which when executed at least in part via a processing unit perform a method for kinetic mapping, comprising:
clustering a set of images into a first image cluster based upon locational information and encapsulating the first cluster of images to create a first portal;
identifying a point of interest based on locational information and encapsulating the point of interest to create a second portal;
generating a kinetic geospatial interface comprising the first portal displayed according to a first focused scale, the second portal displayed according to a second focused scale, and non-portal information displayed according to a collapsed scale;
wherein a level of the granularity of the first focused scale as compared with a level of granularity of the second focused scale is determined by ranking a relevancy of the first image cluster to a user of the kinetic mapping component to a relevancy of the second point of interest to the user of the kinetic mapping component.

* * * * *